350-96.3

XR 3,775,075

United States
Keck et al.

[11] 3,775,075
[45] Nov. 27, 1973

[54] METHOD OF FORMING OPTICAL WAVEGUIDE FIBERS

[75] Inventors: Donald B. Keck, Big Flats; Robert D. Maurer, Painted Post, both of N.Y.

[73] Assignee: Corning Glass Works, Corning, N.Y.

[22] Filed: Jan. 3, 1972

[21] Appl. No.: 214,840

[52] U.S. Cl............ 65/3, 65/4, 65/31, 65/121, 65/DIG. 7, 117/46 FS, 117/105.2, 350/96 B
[51] Int. Cl.............. C03c 25/02, C03b 21/00
[58] Field of Search ............. 117/46 FS, 105.2; 117/94; 65/3, 4, 13, 121, DIG. 7, 31, 61, 18; 350/96 B

[56] References Cited
UNITED STATES PATENTS

| 3,455,666 | 7/1969 | Bazinet | 65/61 X |
| 3,659,915 | 5/1972 | Maurer et al. | 65/30 X |
| 3,589,878 | 6/1971 | Achener | 65/60 X |
| 3,275,428 | 9/1966 | Siegmund | 65/31 X |
| 2,272,342 | 2/1942 | Hyde | 65/18 X |
| 3,146,082 | 8/1964 | Hicks et al. | 65/61 |

*Primary Examiner*—Robert L. Lindsay, Jr.
*Attorney*—Clarence R. Patty, Jr. et al.

[57] ABSTRACT

A method of forming an optical waveguide by first forming a coating of glass with a predetermined index of refraction on the outside peripheral wall surface of a glass cylinder having a different predetermined index of refraction. The glass cylinder and glass coating combination is then heated and drawn to reduce the cross-sectional area and form a clad optical fiber where the core is formed from the glass cylinder and the cladding is formed from the glass coating.

19 Claims, 4 Drawing Figures

3775075
NO OR CLASSIF

FLAME HYDROLYSIS BURNER

3,775,075

METHOD OF FORMING OPTICAL WAVEGUIDE FIBERS

BACKGROUND OF THE INVENTION

Field of the Invention

Waveguides used in optical communications systems are herein referred to as "optical waveguides" and are normally constructed from a transparent dielectric material such as glass or plastic.

It is well known to one skilled in the art that light can be caused to propagate along a transparent fiber structure which has a higher refractive index than its surroundings. The ordinary use of such optical fibers is to transmit light which has been modulated in some form from one point to another. Optical fibers produced for these purposes must avoid excessive attenuation of the transmitted light to be effective. However, to be an effective transmitting media for an optical communications system, an optical waveguide should not only transmit light without excessive attenuation, but also should be constructed to minimize cross-talk from adjacent waveguides. In addition, such an optical waveguide should not cause dispersion of the transmitted light, and should allow only preselected modes of light to propagate along the fiber.

Operational theories and other pertinent information concerning optical waveguides may be found in U.S. Pat. No. 3,157,726 issued to Hicks et al., in the publication entitled "Cylindrical Dielectric Waveguide Mode" by E. Snitzer, Journal of the Optical Society of America, Vol. 51, No. 5, pages 491–498, May 1961, and in "Fiber Optics - Principles and Applications" by N. S. Kapany, Academic Press (1967).

The propagation of light waves is governed by the same laws of physics that govern microwave propagation and, therefore, can also be studied in terms of modes. Since each mode of light traveling along a glass fiber structure propagates at its own inherent velocity, it can be shown that information initially supplied to all modes will be dispersed after traversing a given length of fiber due to different propagation velocities. If light propagation along an optical fiber could be restricted to preselected modes, clearly more effective information transmission would result. Producing a satisfactory optical waveguide has been one of the more difficult problems in the development of an effective optical communications system.

Description of the Prior Art

A method heretofore used for producing an optical fiber is described as follows. A rod of glass possessing the desired core characteristics was inserted into a tube of glass possessing the desired cladding characteristics. The temperature of this combination was then raised until the viscosity of the materials was low enough for drawing. The combination was then drawn until the tube collapsed around and fused to the inside rod. The resulting combination rod was then further drawn until its cross-sectional area was decreased to the desired dimensions. During the drawing process, the rod and tube would normally be fed at different speeds to attempt to produce a fiber with the desired core to cladding diameter ratio. This method, however, has been sometimes unsatisfactory because of the particular difficulty in maintaining the core and cladding dimensions. An additional problem is that numerous tiny air bubbles and foreign particles are often trapped at the core and cladding interface and become a source of light scattering centers. In addition, the core and cladding materials of any waveguide must be selected so that there is a precise difference between the two indices of refraction. Glass tubes and glass rods which simultaneously have precise differences in their indices of refraction, similar coefficients of expansion and similar viscosities are not readily available. Variations in core diameter or in either index of refraction may significantly affect the transmission characteristics of a waveguide.

SUMMARY OF THE INVENTION

It is an object of the present invention to provide an optical waveguide and a method for economically producing it which overcome the heretofore noted disadvantages.

Other objects of the present invention are to provide a method for producing an optical waveguide that will not cause excessive light absorption losses, that will not cause excessive dispersion in the transmitted light, and that prevents the formation of light scattering centers at the core and cladding interface and otherwise improves the interface.

Broadly, according to this invention an optical waveguide is produced by applying a coating of material to the outside peripheral wall of a glass cylinder. This coating is a glass possessing the optical and physical qualities desired of the waveguide cladding. This coated member forming a composite glass structure is then heated until the structure reaches a temperature at which the materials have a low enough viscosity for drawing, and is then drawn to reduce the diameter thereof and form a glass optical fiber which possesses the characteristics of an effective optical waveguide. That is, it transmits preselected modes of light without excessive absorption losses, and provides an improved cladding-core interface to substantially reduce scattering losses.

These and additional objects, features and advantages of the present invention will become apparent to those skilled in the art from the following detailed description and the attached drawing, on which by way of example, only the preferred embodiments of this invention are illustrated.

DETAILED DESCRIPTION OF THE INVENTION

It is to be noted that the drawings are illustrative and symbolic of the invention and there is no intention to indicate scale or relative proportions of the elements shown therein.

Figure 1:
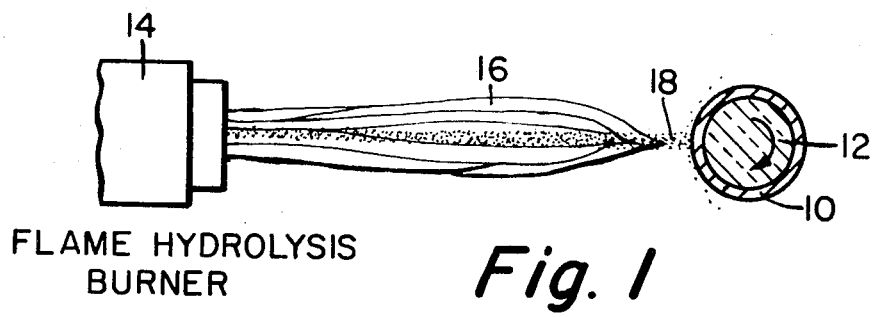
FIG. 1 is an illustration of a means of applying a coating to the outside of a cylindrical member.

One method of forming a coated member, from which a clad optical fiber suitable for use as an optical waveguide can be formed, is illustrated in FIG. 1. A coating 10 of glass is applied to a substantially cylindrical glass member 12 by means of a flame hydrolysis burner 14. Burner 14 emits a flame 16 in which a gas-vapor mixture is hydrolyzed to form a soot. The soot leaves flame 16 in a stream 18 and is directed to cylindrical member 12. The flame hydrolysis method of forming coating 10 is hereinafter described in detail. The cylindrical member 12 will form the core of the waveguide while coating 10 will form the cladding. As will be hereinafter described, the index of refraction of a waveguide core must be greater than the index of refraction of the cladding for proper operation.

The materials of the core and cladding of an optical waveguide should be produced from a glass having minimum light absorption characteristics, and although any optical quality glass may be used, a particularly suitable glass from which to make an optical waveguide is fused silica. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the index of refraction thereof. Therefore, if pure fused silica is used as the cladding glass, fused silica doped with a material to increase the index of refraction can be used as a core glass.

There are many suitable materials that can satisfactorily be used as a dopant alone or in combination with each other. These include, but are not limited to, titanium oxide, tantalum oxide, tin oxide, niobium oxide, zirconium oxide, aluminum oxide, lanthanum oxide, and germanium oxide. The amount of dopant used should be kept to a minimum for various reasons. First, since additional doping material would cause the index of refraction to increase, the difference between the index of refraction of the cladding glass and the core glass will also increase requiring a decrease in the allowable core diameter of the waveguide as hereinafter explained. Second, if an excessive amount of doping material is added to the base material, a loss in light transmission will result. Desirably, a small yet precise amount of dopant should be added to the base material for the primary purpose of changing the index of refraction. For the purposes of the present invention, the amount of dopant is preferably maintained below about 15 percent by weight of the total composition.

A particularly effective method of forming a cylinder member is accomplished by first preparing a boule made by a flame hydrolysis process similar to that described in U.S. Pat. No. 2,272,342 issued to J. F. Hyde or U.S. Pat. No. 2,326,059 issued to M. E. Nordberg. A modification of the Nordberg process that will provide a titanium doped fused silica boule is as follows. Dry oxygen is bubbled through a tank containing a liquid mixture of approximately 53 percent by weight silicon-tetrachloride, $SiCl_4$, and 47 percent by weight titanium-tetrachloride, $TiCl_4$, which mixture is at a temperature of approximately 35°C. $SiCl_4$ and $TiCl_4$ vapors picked up by the oxygen are then passed through a gas-oxygen flame where they are hydrolyzed to form a soot, that is, minute glass particles, with a composition of approximately 95 percent by weight $SiO_2$ and 5 percent by weight $TiO_2$. The glass soot leaves the flame in a steady stream, and is deposited on some member such as a heated substrate. The size of the resulting boule is determined by the amount of soot deposited which is primarily controlled by the flow rates and the time allowed for deposition. It is to be understood that, when the soot is deposited on a heated substrate, it sinters as the boule is formed, otherwise the deposited soot would have to be subsequently sintered.

A suitable cylindrical member 12 may then be formed by core drilling such a glass cylinder from the boule. The outside surface of this cylinder must be carefully polished and cleansed to remove surface irregularities and contamination which might later cause light scattering. Surface polishing may be achieved by mechanical polishing, fire polishing, laser milling, or the like. A particularly suitable method of smoothing the outside surface of the cylinder is accompanied by first mechanically polishing the rough surface left by core drilling and thereafter flame polishing the mechanically polished surface. Hydrofluoric acid washing of the surface should be performed before and after all polishing operations to avoid contamination.

Coating 10 of glass is thereafter applied to cylindrical glass member 12. The coating glass must have suitable physical and optical properties, such as viscosity, coefficient of expansion, and index of refraction. The desired coating may be applied by a variety of methods including but not limited to radio frequency sputtering, sintering a coating of soot deposited by the flame hydrolysis process, chemical vapor deposition, depositing a glass frit, and the like. A particularly effective means is to sinter a soot layer of the desired material applied by the modified flame hydrolysis process heretofore described. Since the index of refraction of the cladding and consequently the coating glass must be lower than that of the core, the coating glass may be of the same base material as the core except that it is undoped, or doped to a lesser degree than that of the core. If coating 10 is applied by the modified flame hydrolysis process heretofore described, the process parameters would be substantially the same, except that the starting liquid mixture would either not contain titanium-tetrachloride so that the resulting coating would be $SiO_2$ or contain a lesser amount of titanium-tetrachloride so that the resulting coating would be $SiO_2$ doped to a lesser degree than the core.

The necessary characteristics of an optical waveguide to transmit a useable quantity of light is depenent upon light energy not being lost through radiation due to light scattering centers, as well as not being excessively absorbed by the glass material. These centers are often caused by tiny air bubbles or impurities in a waveguide at the core-cladding bond. The method of this invention combines an unusually clean and strong bond, thus eliminating most of such light scattering centers.

To limit light propagation along an optical waveguide to preselected modes, whether a single mode or multimode operation is desired, the core diameter, the core index of refraction, and the cladding index of refraction must be coordinated according to the following equation.

$$R = (2\pi a)/(\lambda) \sqrt{n_1^2 - n_2^2}$$

where:
  R = the cutoff value for the light mode or modes that are desired to be propagated through the fiber (R = 2.405 when light mode $HE_{11}$ is propagated)
  a = radius of the core λ = wavelength of transmitted light (sodium light = 5893A)
$n_1$ = core index of refraction
$n_2$ = cladding index of refraction An example of the means for determining the coordinated values of the core radius "$a$", the core index of refraction $n_1$, and the cladding index of refraction $n_2$ may be as follows. When pure fused silica is chosen to be the cladding glass, the index of refraction of the cladding would be approximately 1.4584. An index of refraction of 1.4584 for fused silica is generally accepted for sodium light having wavelength λ= 5893A. Further, if the weight percentage of $SiO_2$ and $TiO_2$ are selected so that the core glass has a resulting index of refraction of 1.466, and the cutoff value is selected such that only the desired light mode or modes will propagate through the fiber, the core diameter necessary to limit light propagation to such desired mode or modes within the optical waveguide can then be determined by solving the above equation for core radius "$a$".

It has been found that light absorption properties may be decreased and light transmission qualities improved in titanium oxide doped fused silica formed into optical waveguides, if the waveguides are drawn in an oxygen atmosphere and then heat treated in a suitable oxygen, nitrogen, or the like atmosphere. Such heat treatment may consist of heating the waveguide in an oxygen atmosphere to between 500°C. and 1100°C. for not less than 0.5 minutes. The length of heat treatment being related to the treatment temperature, that is, lower temperatures require longer heat treatment time while heat treatment at higher temperatures requires a shorter period of time.

Figure 2:
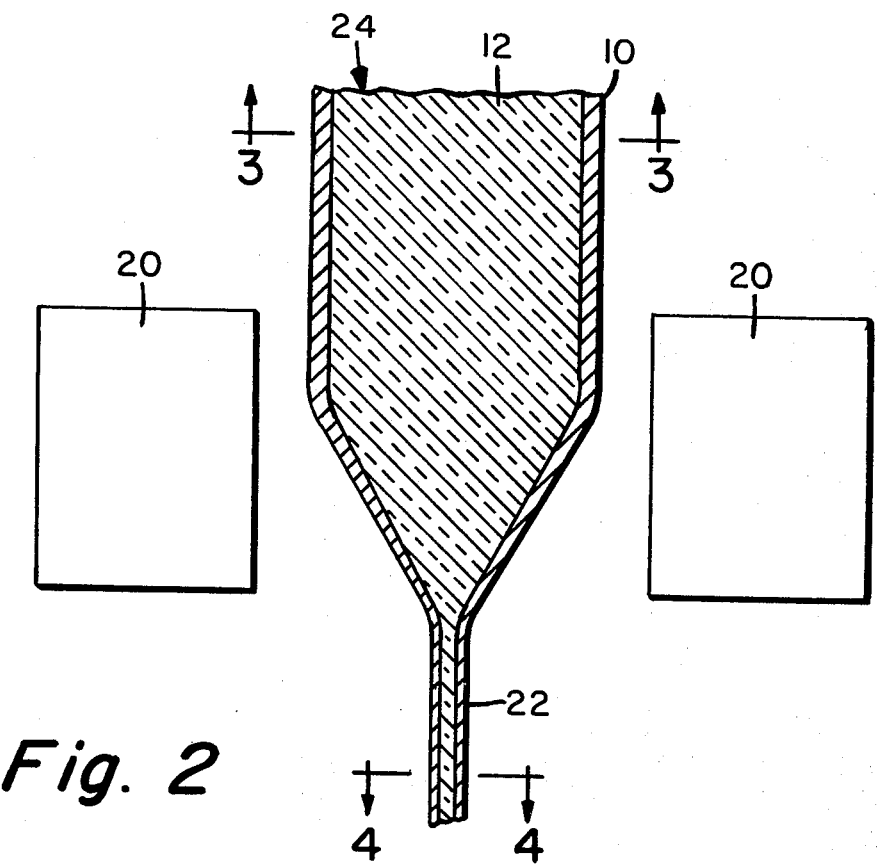
FIG. 2 is a fragmentary elevation partly in cross-section of an optical fiber formed in accordance with the present invention.
Figure 3:
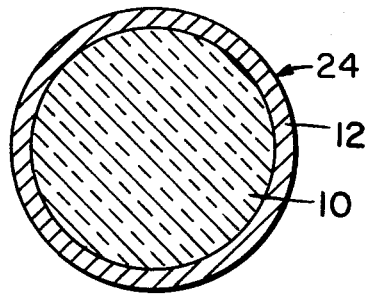
FIG. 3 is a cross-sectional view taken along line 3—3 of FIG. 2.
Figure 4:
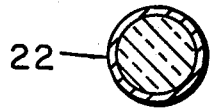
FIG. 4 is a cross-sectional view taken along line 4—4 of FIG. 2.

After cylindrical glass member 12 has a coating 10 of glass applied to the peripheral wall surface thereof, the composite structure is heated by furnace 20 as illustrated in FIG. 2. After the structure reaches a temperature at which the materials have a low enough viscosity for drawing, it is drawn until the cross sectional size thereof is reduced sufficiently to produce fiber 22. Such a clad fiber thereafter forms the optical waveguide. In FIG. 3 there is illustrated the cross sectional view of the composite structure 24 before it is drawn comprising member 10 and coating 12. FIG. 4 illustrates the cross section of fiber 22 drawn to the desired cross sectional dimensions. The total diameter to core diameter ratio for multimode optical waveguides is preferably in the range of 1001:1000 to 10:1, and for single mode waveguides in the range of 10:1, to 1000:1, although ratios outside of these ranges would also be operable.

A specific example of a multimode waveguide produced by the method of the present invention is as follows. A cylindrical piece of glass approximately four inches long and one-half inch in diameter was core drilled from a solid boule of a 2.6 weight percent $TiO_2$ and 97.4 weight percent $SiO_2$ glass. The outside surface was mechanically polished and flame polished to a very high degree with hydrofluoric acid washing before and after each polishing. A layer of fused silica soot approximately 5.9 mm thick was deposited on the outside surface. The resulting structure was slowly lowered into a furnace whose hottest zone was approximately 2000°C, where the soot was first sintered and then the entire structure redrawn to fiber dimensions. This entire operation took place in an atomosphere containing a large percentage of oxygen. The resulting waveguide had a core diameter of about 50 μm and a total diameter of about 80 μm.

A specific example of a single mode waveguide produced by the method of the present invention is as follows.

A cylindrical rod of glass approximately 0.05 inch in diameter is core drilled from a solid glass boule comprising approximately one weight percent $TiO_2$ and 99 weight percent $SiO_2$. The rod of core glass is cut to a convenient length, such for example as four to six inches, and is sealed to a supporting rod. A coating of fused silica soot is applied to the outside of the core glass rod until a total diameter of approximately two inches is achieved. The resulting structure is then placed in a furnace where the coating is first sintered and the structure then continuously redrawn in an oxygen atmosphere into a fiber having a total diameter of 0.005 inch. Taking account of the size reduction of the cladding during sintering, a waveguide having a core diameter of about 6 μm is produced. The refractive indices of the core and cladding are such as to produce a value of R less than 2.405 for a transmitted light having a wavelength of λ = 0.6328 μm thereby resulting in single mode propagation.

Although the present invention has been described with respect to specific details of certain embodiments thereof, it is not intended that such details be limitations upon the scope of the invention except insofar as set forth in the following claims.

We claim:

1. A method of forming a clad vitreous optical fiber comprising the steps of
   providing a solid substantially cylindrical glass member having a smooth outside peripheral surface, said glass member forming the core of said vitreous optical fiber,
   applying particulate material to said smooth outside peripheral surface of said member to form an adherent coating of glass having an index of refraction less than that of said glass member, the composition of said coating of glass being compatible with that of said glass member, said coating forming the cladding of said vitreous optical fiber,
   heating the structure so formed to the drawing temperature of the materials thereof, and
   drawing the heated structure to reduce the cross-sectional area thereof and form said clad vitreous optical fiber.

2. The method of claim 1 further including the steps of forming the cylindrical glass member comprising
   core drilling a cylinder from a boule of glass,
   mechanically polishing the exterior surface of said cylinder, and
   flame polishing the mechanically polished surface.

3. The method of claim 1 wherein the coating of glass is applied by the steps comprising
   depositing a coating of soot of cladding glass to said outside peripheral surface of said solid cylindrical glass member by flame-hydrolysis, and
   heating said member and coating until said soot sinters prior to said drawing step.

4. The method of claim 3 wherein the sintering of the coating of glass and drawing of the structure is accomplished by the same heating operation.

5. The method of claim 1 wherein said coating of glass is fused silica and the glass material is fused silica doped with at least one mandrel selected from the group consisting of titanium oxide, tantalum oxide, tin oxide, niobium oxide, zirconium oxide, aluminum oxide, lanthanum oxide, and germanium oxide.

6. The method of claim 1 wherein said coating of glass and cylindrical glass member are drawn in substantially an oxygen atmosphere.

7. The method of claim 1 wherein the coating of glass is applied by radio frequency sputtering.

8. The method of claim 1 wherein the coating of glass is applied by chemical vapor deposition.

9. The method of claim 1 wherein said coating of glass is formed by applying glass frit to the exterior surfaces of said cylindrical glass member.

10. The method of claim 1 wherein said clad fiber is heat treated in an oxygen atmosphere.

11. The method of claim 2 wherein said coating of glass is applied by the steps comprising
depositing a thin layer of soot on said outside peripheral surface of said solid cylindrical glass member by flame hydrolysis, and
sintering said soot prior to the drawing step to form a cladding glass having an index of refraction less than that of said cylindrical glass member.

12. The method of claim 11 wherein the total diameter to core diameter ratio is within the range of about 1001:1000 to 1000:1.

13. The method of claim 11 wherein said cylindrical glass member is formed of fused silica doped with not more than 15 percent by weight of titanium oxide and the coating of glass is fused silica.

14. The method of claim 11 further comprising the steps of washing said exterior surface of said cylindrical glass member with hydrofluoric acid following each of the mechanical polishing and flame polishing steps.

15. The method of claim 11 wherein said structure is drawn in an oxygen atmosphere.

16. The method of claim 15 further comprising the step of heat treating said clad fiber in oxygen atmosphere after it has been drawn.

17. The method of claim 16 wherein the coating of glass is sintered and the structure is drawn by the said heating operation.

18. The method of claim 17 wherein the total diameter to core diameter ratio is within the range of about 10:1 to 1000:1.

19. An optical waveguide produced by the method of claim 1.

* * * * *